(12) United States Patent
Marcantoni

(10) Patent No.: US 10,800,616 B2
(45) Date of Patent: Oct. 13, 2020

(54) CONVEYING MACHINE FOR CONTAINERS

(71) Applicant: MAKRO LABELLING S.R.L., Goito (IT)

(72) Inventor: Simone Marcantoni, Ponti sul Mincio (IT)

(73) Assignee: MAKRO LABELLING S.R.L., Goito (IT)

( * ) Notice: Subject to any disclaimer, the term of this patent is extended or adjusted under 35 U.S.C. 154(b) by 0 days.

(21) Appl. No.: 16/730,215

(22) Filed: Dec. 30, 2019

(65) Prior Publication Data

US 2020/0130958 A1 Apr. 30, 2020

Related U.S. Application Data

(63) Continuation of application No. 16/062,539, filed as application No. PCT/IB2016/005761 on Dec. 14, 2016, now Pat. No. 10,518,987.

(30) Foreign Application Priority Data

Dec. 14, 2015 (IT) .......................... 102015000082929

(51) Int. Cl.
*B65G 54/02* (2006.01)
*B65C 9/04* (2006.01)
*B65C 3/06* (2006.01)
*B65G 47/244* (2006.01)

(52) U.S. Cl.
CPC ................ *B65G 54/02* (2013.01); *B65C 3/06* (2013.01); *B65C 9/04* (2013.01); *B65C 9/045* (2013.01); *B65G 47/244* (2013.01); *B65G 2201/0244* (2013.01)

(58) Field of Classification Search
CPC .... B01L 2200/25; B01L 3/545; B01L 13/547; B65B 59/00; B65G 47/244; B65G 47/2445; B65G 3/06; B65G 54/02
See application file for complete search history.

(56) References Cited

U.S. PATENT DOCUMENTS 9,950,875 B2 * 4/2018 Walter ................ B65G 47/715

* cited by examiner

*Primary Examiner* — Gene O Crawford
*Assistant Examiner* — Lester III Rushin
(74) *Attorney, Agent, or Firm* — Workman Nydegger

(57) ABSTRACT

A conveying machine for containers, comprising at least one base module having a predetermined length according to a feed direction of the containers and at least a supporting carriage for the containers slidably mounted on said base module. The base module and carriage together define a linear motor, wherein the stator is the base module and the rotor is the carriage. The machine comprises a supporting plate for the containers, which is rotatably mounted on the carriage and means for moving the plate, which is operatively connected to the plate to rotate it on itself.

15 Claims, 10 Drawing Sheets

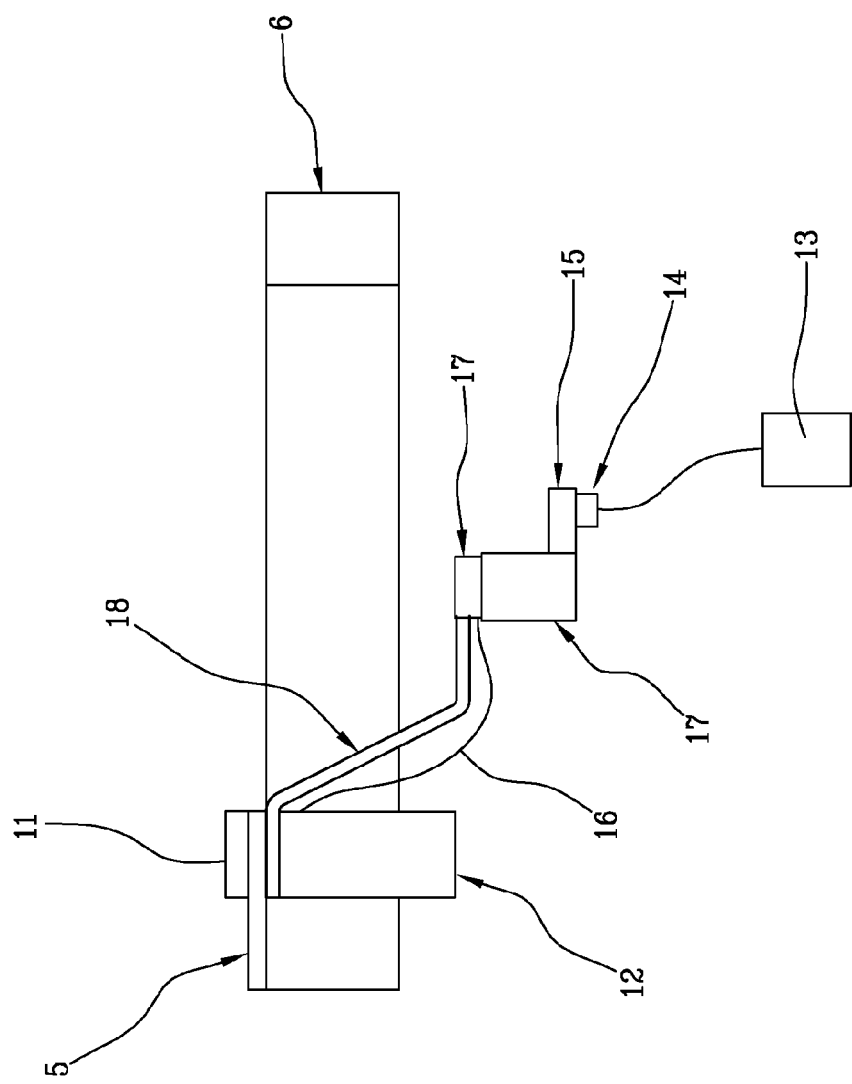

CONVEYING MACHINE FOR CONTAINERS

CROSS-REFERENCE TO RELATED APPLICATIONS

This application is a continuation of U.S. patent application Ser. No. 16/062,539, filed Jun. 14, 2018 and scheduled to issue as U.S. patent Ser. No. 10/518,987 on Dec. 31, 2019, which is a U.S. National Stage of PCT/IB2016/05761, filed Dec. 14, 2016, which claims priority to IT Application No. 102015000082929, filed Dec. 14, 2015. These applications are incorporated in their entirety by reference herein.

STATEMENT REGARDING PRIOR DISCLOSURES BY THE INVENTOR OR A JOINT INVENTOR

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

The present invention relates to a conveying machine for containers. In particular, the present invention relates to the sector of work machines for containers suitable for moving a container along a predefined feed direction and for carrying out, during the movement, a plurality of automatic operations thereon (e.g. labelling, filling, capping, . . . ) by means of predefined units connected along the feed direction.

(2) Description of Related Art Including Information Disclosed Under 37 CFR 1.97 and 1.98

At present, conveying machines used for operating on containers are, at least in the majority, of the rotating carousel type. The carousel has, on a periphery thereof, predefined supporting stations (commonly defined by a "plate") on which the containers to be treated are positioned. In particular, the carousel has a central rotation axis and for the plates has respective rotation axes parallel to the central axis.

Each plate is rotatable on itself by taking the movement mechanically from the rotation of the carousel (for example by means of cam organs or another method) or, in the most recent machines, is provided with its own electric motor that is commendable by a control unit independently with respect to the rotation of the carousel.

In this way the container loaded on the plate can be rotated as a function of the work units arranged along the carousel. For example, in order to carry out labelling operations on the container, it is necessary to perform a preliminary rotation of the container on itself in order to detect the application position of the label (by means of a suitable detecting sensor) in order then to arrange the container in the position prior to or at the labelling unit.

However, the present technology has some drawbacks.

In fact, according to the production velocity to be attained, according to how many labels are to be applied on the container and according to the diameter of the container, it is necessary to modify, time by time, the diameter of the carousel, the number of plates, the number of the labelling units. For example, a carousel having a diameter of 600 mm is only just sufficient for housing 4 labelling units. If it were necessary to add a further labelling group or, for example, a laser printer or a viewing system for quality control of the labelling, there would be no more space available and therefore it would be necessary to pass to a carousel having a larger diameter.

The greater the diameter of the carousel, the greater the length of the periphery thereof and naturally the greater the possibility of coupling modules therewith.

Therefore, each carousel has a maximum number of modules that can be applied and if it is desired to add others it is necessary to change the carousel (with all the drawbacks involved).

Additionally if it is desired to increase the production velocity it is necessary to increase the number of plates, which naturally implicates the need to increase the diameter of the carousel. Once the diameter of the carousel and the number of the plates are defined, the step of the machine is automatically defined, i.e. the distance between one container and another.

Further, a further consideration to be made is that the application of the label on the container, whether using paste paper or whether the label is self-adhesive, should be done in such a way that the peripheral velocities of the label and the container are equal (so as to avoid the formation of wrinkles, reciprocal sliding or poor positioning of the label). Therefore, the length of the label, as well as the physical dimensions of the container, represents a datum to be taken into account during the step of dimensioning the machine step. In other words, it is difficult to implement the application of a label that is longer than the machine step.

Consequently, the machine step also determines the maximum length of the label that can be applied.

Further, as the periphery of the carousel is round, the coupling of the labelling modules thereto is carried out on a rounded surface, and this is difficult to carry out with respect to a linear machine (nowadays rarely used).

Lastly, it should be noted that in order to guarantee a correct application of the label to the container, the peripheral velocities of the container and the label must be the same. This means that the peripheral velocity of the label must coincide with the product of the angular velocity of the carousel multiplied by the sum of the radius of the carousel and the radius of the container. Therefore the greater the radius of the container, the greater the velocity of the label must be.

BRIEF SUMMARY OF THE DISCLOSURE

In this situation, the object of the present invention is to realise a conveying machine for containers which obviates the above-cited drawbacks.

It is a particular aim of the present invention to realise a conveying machine for containers which enables modifying the production characteristics by reducing the physical modifications to be carried out on the machine or the treatment units of the containers.

A further aim of the present invention is to realise a conveying machine for containers which enables applying labels having different lengths to the containers in movement, independently of the production velocity and/or the curvature of the carousel.

The above-indicated objects are substantially attained by a conveying machine for containers according to what is described in the appended claims.

BRIEF DESCRIPTION OF THE SEVERAL VIEWS OF THE DRAWING(S)

Further characteristics and the advantages of the present invention will appear more clearly from the detailed description of some preferred, but not exclusive, embodiments of a conveying machine for containers illustrated in the appended drawings, wherein:

FIG. 2 is a schematic and section view of a detail of the conveying machine of FIG. 1;

Figure 1:
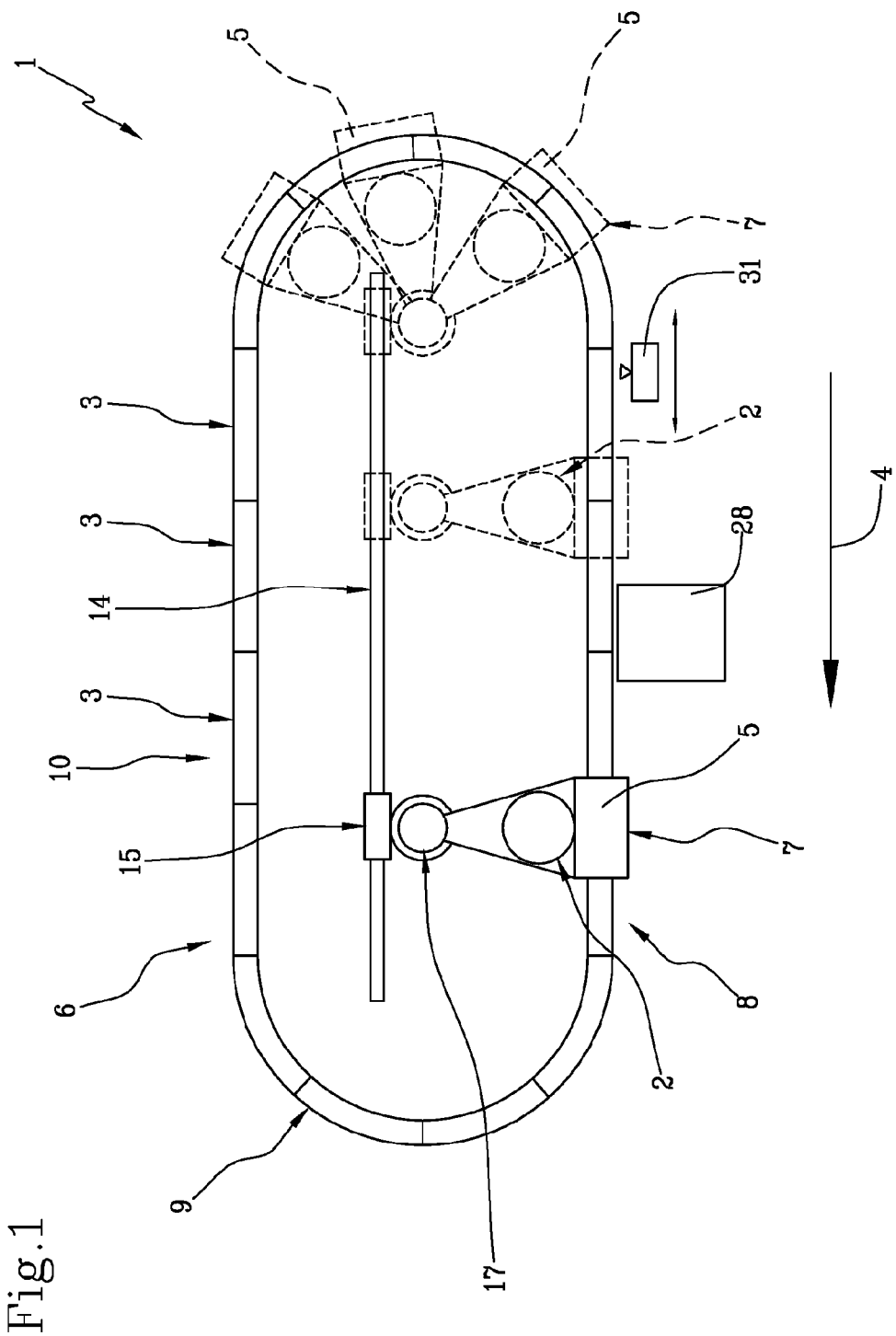
FIG. 1 is a schematic view from above of the conveying machine of containers according to the present invention.

With reference to the cited figures, reference numeral 1 denotes in its entirety a conveying machine for containers 2 according to the present invention.

DETAILED DESCRIPTION OF THE INVENTION

The conveying machine 1 comprises at least one base module 3 having a predefined length according to a feed direction 4 of the containers 2 and at least a supporting carriage 5 for the containers 2 slidably mounted on said base module 3 and mobile along said feed direction 4 for movement of the containers 2. In this way, the carriage 5 and the base module 3 define at least a part of a main feed circuit.

In particular, the base module 3 and carriage 5 together define a linear motor, wherein the stator 6 is defined by the base module 3 and the rotor 7 is defined by the carriage 5. The linear motor is preferably of a type in which the base unit comprises a plurality of consecutive electric windings along the feed direction 4 and configured to generate an electromagnetic field on command. The carriage 5 comprises one or more permanent magnets arranged in a position of interaction with said windings. In this way, by powering the electric windings in sequence along the feed direction 4, a displacement of the electromagnetic field is created and, consequently, a displacement of the carriage 5 due to the interaction with the permanent magnets.

This linear motor will not be further described in the following as it is a part of the prior art.

In the preferred embodiment, the carriage 5 is mounted superiorly of the base module 3 or laterally with respect to the base module 3, or inferiorly of the base module according to a vertical reference direction.

As can be seen in the accompanying drawings, the machine 1 comprises a plurality of base modules 3 connected consecutively to define a single stator 6 extending along the feed direction 4 of the containers 2. In other words, the plurality of base modules 3 are configurable between a reciprocal engaged condition in which the base modules 3 are connected consecutively to define a single and modulable stator 6 extending along the feed direction 4 of the containers 2, and a disconnected condition in which they are mutually disconnected.

In this way, the main feed circuit is modulable and it is therefore advantageously possible to increase or reduce the length or the shape of the stator 6 as a function of the number of treatment units of the containers 2 which is to be applied on the machine 1.

There are preferably straight base modules 3 and curved base modules 3. These modules are arranged along the feed direction 4 so as to define a predefined pathway.

The modules are preferably arranged in sequence along the feed direction 4 having at least a straight forward portion 8, a curved portion 9 and a straight return portion 10. The curved portion 9 is defined by one or more curved modules arranged in sequence so as to define this curved portion 9. The curved portion 9 preferably defines a 180° curve and can be formed by one or more curved modules connected in sequence. In this way the stator 6 has a straight forward part, a straight return part and a curved part arranged between the first two parts. Further, the stator 6 comprises a further curved portion 9 arranged between the return portion and the forward portion so as to define a closed circuit. In practice, this closed circuit has substantially a "0" shape (zero).

In other words, the plurality of modules defines a closed circuit. It is further of note that the curved portion 9 has a constant radius (i.e. once mounted it remains the same for any configuration of the straight modules). The straight portion is modulable, i.e. it is possible to add different base modules 3 in sequence.

In practice, each base module 3 can extend along a straight or curved direction.

In an alternative embodiment, the feed direction 4 is circular or annular and the base modules 3 which make it up have a curved extension, preferably with a constant radius In other words, the stator 6 has a circular shape In this way, it is advantageously possible to optimise the perimeter length of the pathway with respect to the "0" shape mentioned previously.

As the curved modules have a predefined constant radius, the machine 1 advantageously enables interfacing with predefined constant-radius star conveyors of the containers 2 without any need to match the radius of the carousel as defined in the section relating to the prior art (naturally the invention does not include the carousel).

Further, the machine comprises at least an application unit 28 of a recognising sign on the container 2 arranged laterally with respect to the feed direction 4 so as to apply the recognition sign on the container 2. This application unit 28 is preferably a labelling unit or a printing unit or another unit besides, not expressly mentioned herein. In the following reference will mainly be made to the preferred case (but not exclusive) of the labelling unit.

Further, according to the preferred embodiment, the machine 1 comprises a plurality of carriages 5 which are movable independently of one another. In other words, the carriages 5 are movable independently of one another in such a way as to be able to vary the reciprocal distance and also the velocity of one with respect to the other. In detail, the base modules 3 comprise electric windings that are separately controllable so as to produce electromagnetic fields in different zones of the assembly of base modules 3 so as to be able to command different carriages 5 independently of one another.

The machine 1 comprises a control unit 13 operatively connected to the carriage 5 so as to command movement thereof along the feed direction. Further, the control unit 13 is able to detect the position of the carriage 5 along the feed direction 4.

Further, the machine 1 comprises a supporting plate 11 for the containers 2, which is rotatably mounted on the carriage 5 and is rotatable about its own axis orthogonal to the feed direction 4 of the containers 2 in such a way as to rotate a respective container 2, in use positioned on the plate 11, about itself.

The plate 11 is configured for supporting a container 2 by a base thereof. Alternatively, the plate 11 comprises retaining means configured for supporting a container 2 by a top of the container 2 (for example by the neck—neck handling). In the latter case, the plate 11 is facing downwards according to a vertical direction.

The machine 1 comprises means 12 for moving the plate 11, which means is operatively connected to the plate 11 to cause the plate 11 to rotate on itself.

There are two preferred embodiments for realising said movement means 12: in a first embodiment (FIGS. 1, 2, 3a, 3b, 3c) the movement means 12 comprises an electric motor, while in a second embodiment (FIGS. 4-8) the movement means 12 comprises a mechanical movement system for interaction between two carriages.

Alternatively to what is illustrated, the movement means 12 might comprise a mechanical movement system for interaction with a fixed external mechanical part.

Note that the control unit 13 is operatively connected to the movement means 12 of the plate 11 for activating the rotation of the plate 11 or for blocking the plate 11 in a desired rotated angular position.

According to the present invention, the control unit 13 is configured for:

controlling the position of the carriage 5 along the feed direction 4;

activating the rotation of the plate 11 before the carriage 5 on which the plate 11 is mounted has reached the application unit 28 so as to bring the container 2 loaded thereon into a desired angular position;

subsequently applying the recognition sign on the container 2 in the rotated angular position.

In other words, it is important to know the position of the container 2 at the application unit 28 so as to correctly apply the recognition sign on the involved part of the container 2.

In particular, there are two different operating modes:

the control unit 13 is configured for maintaining the plate 11 in the rotated angular position during the transit of the carriage 5 to the application unit 28 (e.g. neck labelling or standard adhesive). In that case, the movement means 12 of the plate 11 can comprise a halting system for keeping the plate 11 blocked in the desired rotating angular position; or the control unit 13 is configured for rotating the plate 11 starting from the rotated angular position (known) during the transit of the carriage 5 to the application unit 28 (e.g. roll feed, hot melt or rotating adhesive labelling).

In this way, it is advantageously possible to apply the label, or smooth it, at a predefined portion of the container 2 after the container 2 has been rotated and its position is known.

In any case, the control unit detects the position of the carriage 5 and commands the rotation of the plate before reaching the labelling unit 28. In this way, the container 2 reaches the labelling unit 28 already orientated in the correct position.

As mentioned above, once the correct position has been identified, the application of the recognition sign can take place with the bottle stationary or by rotating it on itself.

According to a first embodiment (motorised movement), the movement means 12 comprises an electric motor operatively connected to the supporting plate 11 so as to rotate it. In other words, the motor is mounted on the carriage 5. In the preferred case of a plurality of carriages 5, each carriage 5 has a dedicated motor.

The motor can be powered by a battery positioned directly on the carriage 5 or can be powered via an external power supply line.

In any case, the control unit 13 is operatively connected (by means of cables or wirelessly or in another way not expressly described herein) to the electric motor and is configured for commanding rotation thereof.

In a case where the motor is powered via an external power supply line, the control unit 13 is preferably interfaced therewith so as to control the electrical energy power supply.

FIGS. 1 and 2 illustrate an example of implementation of the connection of each electric motor of a respective plate 11 with an electrical power source.

In this example, the machine 1 comprises a guide 14 separate from and flanked to the base module 3, a runner 15 slidable on the guide 14 and electric power supply cables 16 of the motor extending between the supporting carriage 5 and an electrical connection unit 17 mounted on the sliding runner 15. Said electrical connection unit 17 comprises a rotating electrical connector connected between the electric power supply cables of the motor and electrical power cables connectable to an electrical power source. The rotating electrical connection unit 17 is configured for transmitting the electrical energy from the electric power source of the motor and the electric power supply cables 16 connectable to the electrical power source. It is further notable that a rigid connecting organ 18 is present between the carriage 5 and the electrical connection unit 17.

The control unit 13 is preferably connected to the electric motor by means of controlling electric cables grouped together with the electric power cables 16 and connected to the electrical connection unit 17. In detail, the electrical connection unit 17 is interposed along the controlling electric cables so as to carry a respective command signal from the control unit 13 to the electric motor of the plate 11. In other words, the control unit 13 generates a respective command signal which is sent to the electric motor via the controlling electric cables.

Alternatively, the control unit 13 can be mounted directly at the plate 11. In this case, the machine 1 comprises a plurality of control units 13, each of which is mounted on a respective carriage 5.

In particular, this electrical connection system is advantageous in a case where said guide 14 and said runner 15 are arranged between said forward portion 8 and said return portion 10 when the stator 6 (defined by the assembly of the base units) defines a closed circuit. In this way, in fact, the power supply cables 16 of the electric motor follow the movement of the carriage 5 along the closed circuit thanks to the electrical connection unit 17, as concerns the curved portions 9 and thanks to the slidable runner 15 for the straight portions 8, 10.

In any case it is worthy of note that the control unit 13 is configured for controlling the electric motors of each plate 11 independently of one another so as to rotate the respective plates 11 independently.

A respective electrical activating unit is preferably connected to each electric motor, which pilots the movements thereof. The connection between the activating unit and the motor is realised locally on the carriage 5, or the motor might be provided with an integrated activating unit. The connection between one activating unit and the other is done in series (a "daisy chain"). In this way a single series of cables 16 coming from the rotating electrical connection unit and going towards the first activating unit is present, and then a further series of cables from one activating unit to another.

According to a second embodiment (mechanical movement), the machine 1 comprises an auxiliary carriage 27 operatively associated to a respective supporting carriage 5 and mobile with respect thereto so as to near or distance or maintain a constant distance therefrom. In practice, the auxiliary carriage 27 follows or anticipates the supporting carriage 5.

The movement means 12 is arranged between the supporting carriage 5 and the auxiliary carriage 27 and are configured for rotating the plate 11 on itself in a case of reciprocal nearing or distancing between the supporting carriage 5 and the auxiliary carriage 27 and for blocking the plate 11 in position in a case of maintaining the constant distance between the two.

It is worthy of note that the auxiliary carriage 27 defines the rotor of a linear motor which can be the same linear motor that the supporting carriage 5 is a part of or another linear motor, different to and detached from the first.

In other words, in the first case (FIG. 4) the auxiliary carriage 27 is mounted on a base module 3 belonging to the main feed circuit of the supporting carriage 5.

In the second case (FIG. 5), the auxiliary carriage 27 is mounted on at least an auxiliary module 30 (preferably a plurality) belonging to an auxiliary circuit that is different with respect to the main feed circuit and having a feed direction parallel thereto. The auxiliary circuit defines a linear motor in which the auxiliary carriage 27 is the rotor thereof.

Figure 6:
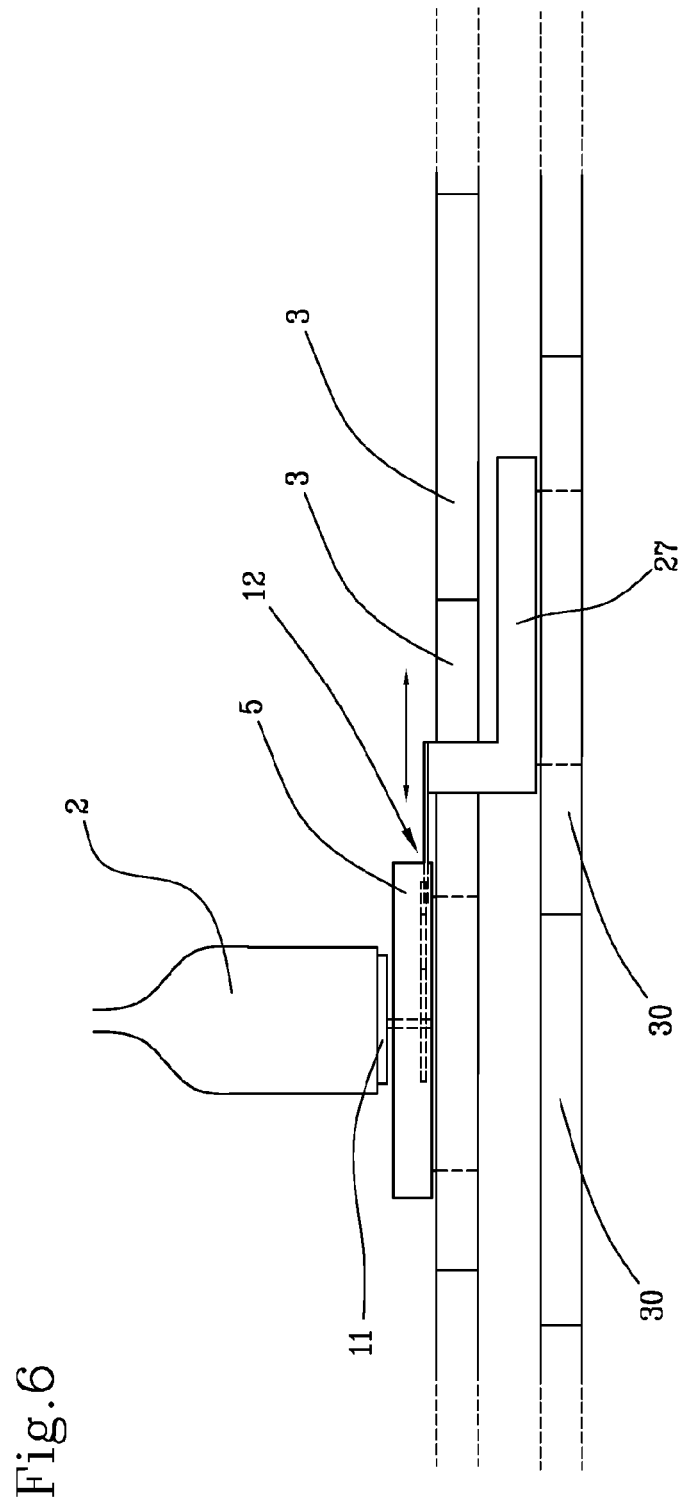
FIGS. 6 and 7 is a schematic lateral view of two possible alternative embodiments of the variant of the second embodiment of FIG. 5.
Figure 7:
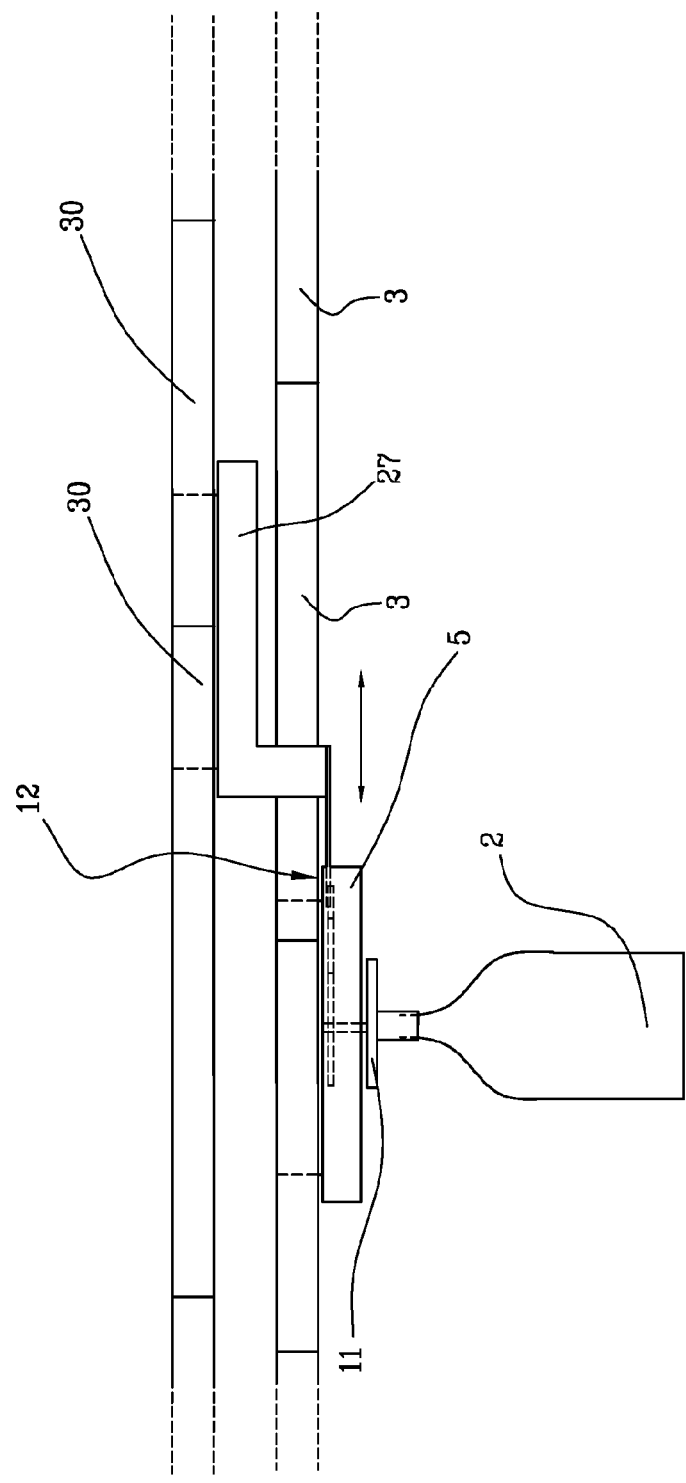

In the latter case, the auxiliary circuit and the main feed circuit are respectively superposed, preferably adjacently (FIGS. 6 and 7).

In both cases of the second embodiment, the movement means 12 comprises a first part connected to the auxiliary carriage 27 and a second part connected to the supporting carriage 5. Said first and second part are in reciprocal contact so that the movement of the first part with respect to the second part generates a rotation of the plate (11). In particular, the first and the second part of the movement means 12 comprises mechanical gearings.

For example, observing figures from 4 to 7, it can be seen that the mechanical gearings comprise a rack for the first part and at least a cogged pinion for the second part to rotate the plate 11.

The auxiliary carriage 27 is preferably mechanically connected to the supporting carriage 5 during the movement of the carriages in such a way that the two carriages travel in pairs substantially at the same velocity apart from reciprocal movements for carrying out the rotation of the plate as described in the foregoing.

The machine 1 preferably comprises a follower device 31 of the container for detecting the orientation of the containers 2 before each thereof reaches the application unit 28.

In this case, as the application of the labels is preferably carried out along a straight portion 8, 10, the follower device 31 can be made to travel forward and backward on another linear motor so as to remain in front of the container 2 for a portion of pathway necessary for carrying out a sampling for the subsequent rotation of the container 2. The carriage 5 can preferably be synchronised to the motion of the follower device 31, slowing or accelerating in order not to demand too-sharp dynamics of the linear motor of the follower device 31.

In other words, the follower device 31 is an external device (preferably comprising a detector such as for example a tv camera) able to follow the bottle at least for a predefined portion of pathway upstream of the application unit 28 with the aim of detecting the angular position of a recognition sign thereon.

In a further alternative embodiment not illustrated in the accompanying figures, the movement means 12 is of a mechanical type and comprises a mechanical transmission operatively interposed between the plate 11 and the base module 3 and designed to collect the movement of the carriage 5 relative to the base module 3 and to move it to the plate 11. For example, the mechanical movement means 12 might comprise a geared rack arranged along the stator 6 and a pinion mounted on the carriage 5 and meshed with said rack. In a further example, the movement means 12 comprises a cam organ arranged along the stator 6 and a sliding organ (e.g. a bearing) mounted on the carriage 5 and operatively in contact with the cam organ. In this case, the cam organ is profiled so as to cause a rotation to the plate 11 at the position of predetermined profilings.

As mentioned in the foregoing, the machine 1 comprises one or more labelling units 28 connected laterally with respect to the base module 3 so as to operate on the container 2 in movement. The labelling unit 28 is preferably connected at an engaging support 19 along a straight portion of the stator 6 so as to simplify the fixing and the application operations of the label on the container 2 transiting on the carriage 5.

The connection of the labelling units 28 on the straight part advantageously enables a drastic simplification of the engaging of the labelling units 28 to the periphery of the machine 1, and enables enormously simplifying the padding operations of the safety guards 20 (usually made of Plexiglas) when the interchangeability function of the labelling unit 28 is present. Making flat Plexiglas surfaces is in fact much simpler than realising round or profiled surfaces.

For the application of the label at a straight portion 8, 10, note that the dispensing velocity thereof is not influenced by the diameter of the bottle, and therefore the application can be made at a slower velocity (an easier application).

In particular, the control unit 13 is configured for rotating the plate 11 by a predefined angle before the labelling unit 28 so as to bring the container 2 into a labelling position at least at the labelling unit 28 according to the feed direction 4. In other words the control unit 13 commands the electric motor of the plate 11 to rotate the container 2 on itself by a predefined angle.

In addition, the control unit 13 is configured for moving the carriages 5 along the feed direction 4 between feed, stationary, reversing configurations. Among the feed configurations, the control unit 13 is configured for accelerating/slowing the carriages 5 as a function of the work requirement to be carried out on the containers 2.

In other words, the control unit 13 is configured for modulating the movement velocity of the single carriages 5. For example, the control unit 13 might be configured for moving the carriage 5 at a slower velocity in front of the labelling unit 28, with the aim of applying the label in conditions of "favourable velocity" then to accelerate in the other portions.

Further, in the context of modulating the velocity of the carriages 5, the control unit 13 might be configured for accelerating the carriage 5 at a first labelling unit 28 and braking it at a second labelling unit 28 as a function of the length of the labels to be applied. In other words, the "machine 1 step" (distance between two plates 11) is varied as a function of requirements. Therefore the present invention enables application of a longer label than the machine step 1.

Figure 3A:
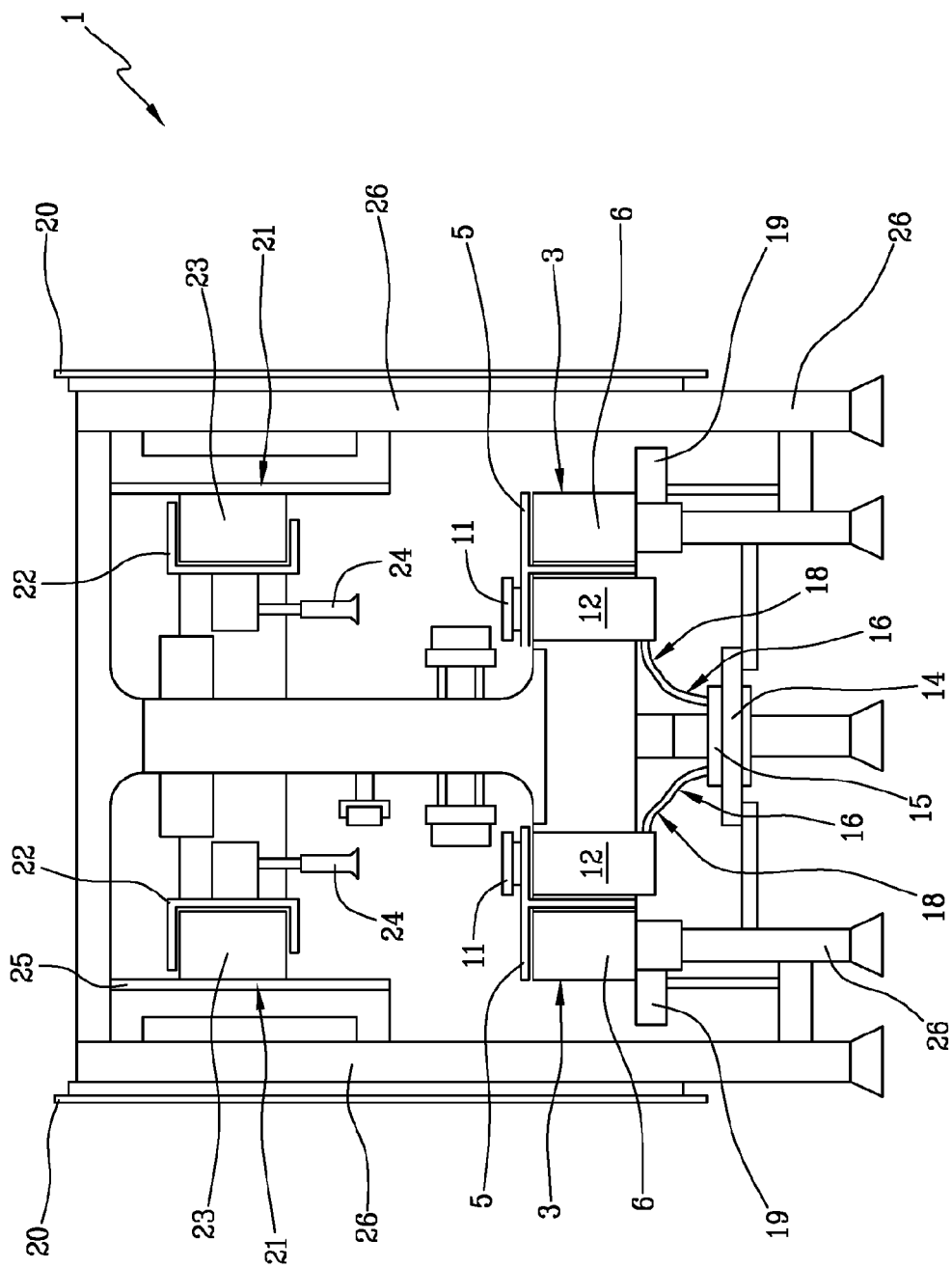
FIG. 3a is a lateral view in section of a first embodiment of the conveying machine for containers.
Figure 3B:
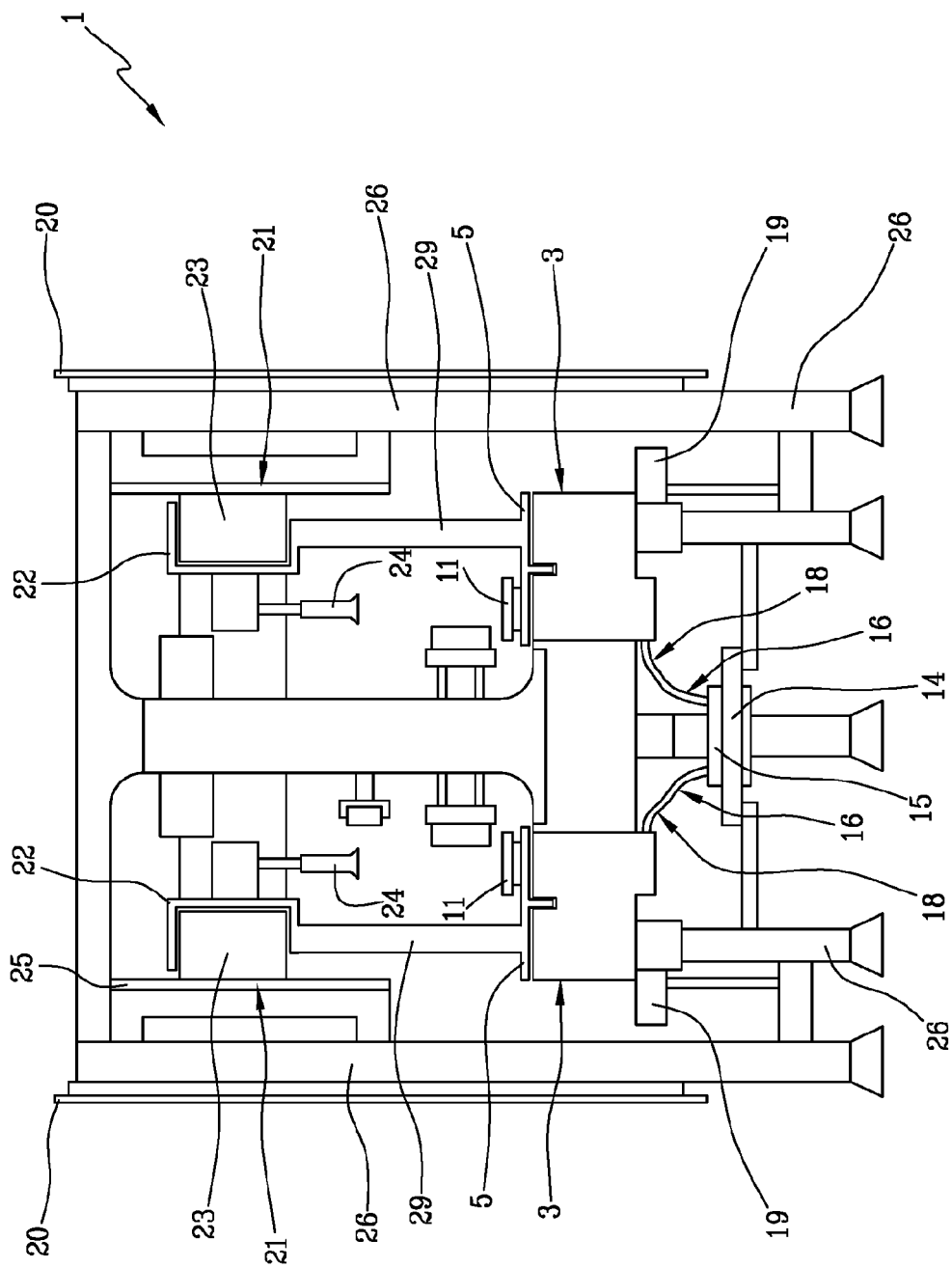
FIG. 3b is a lateral view in section of a first variant of the first embodiment of the conveying machine for containers.
Figure 3C:
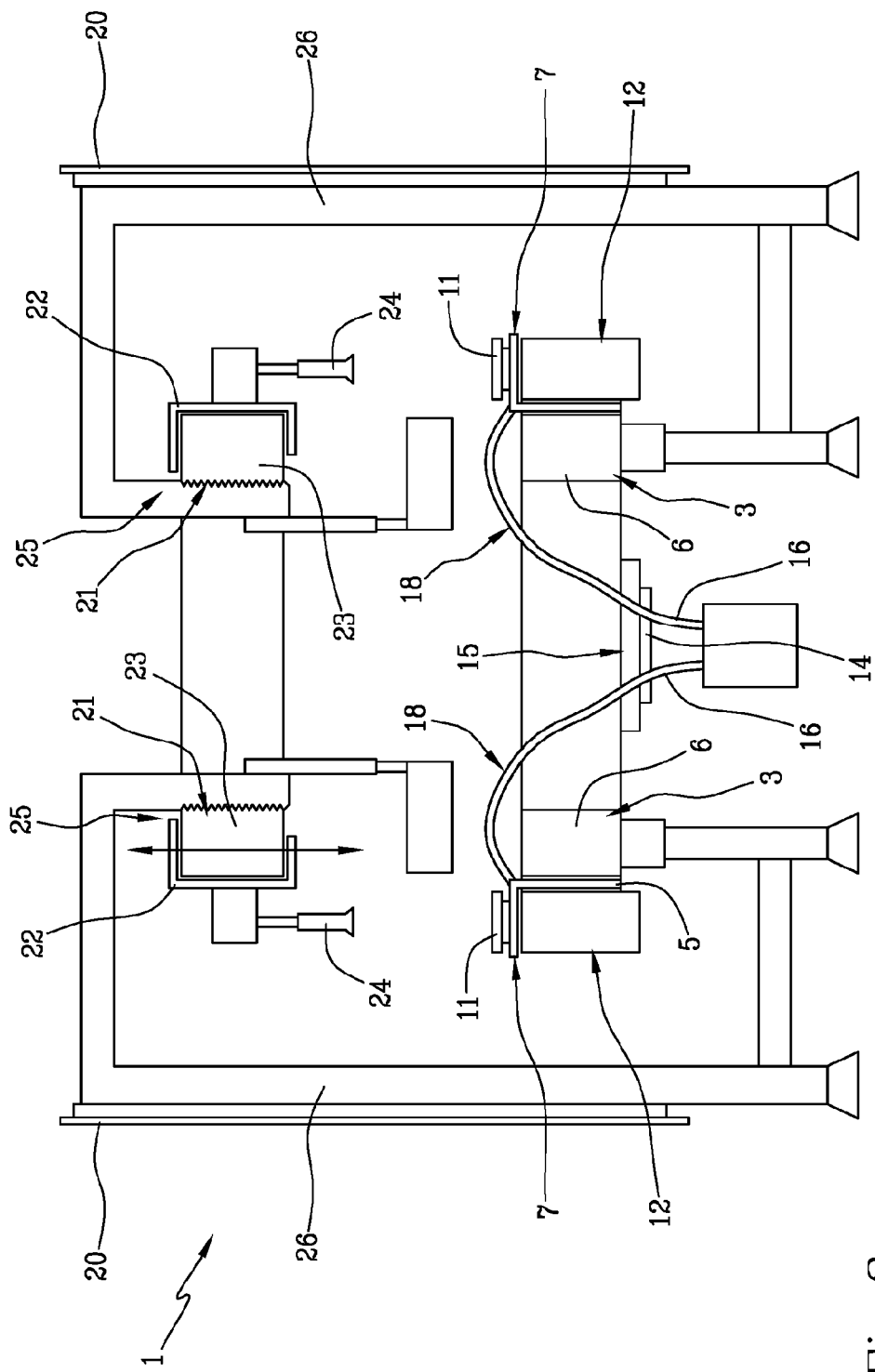
FIG. 3c is a lateral view in section of a second variant of the first embodiment of the conveying machine for containers.
Figure 4:
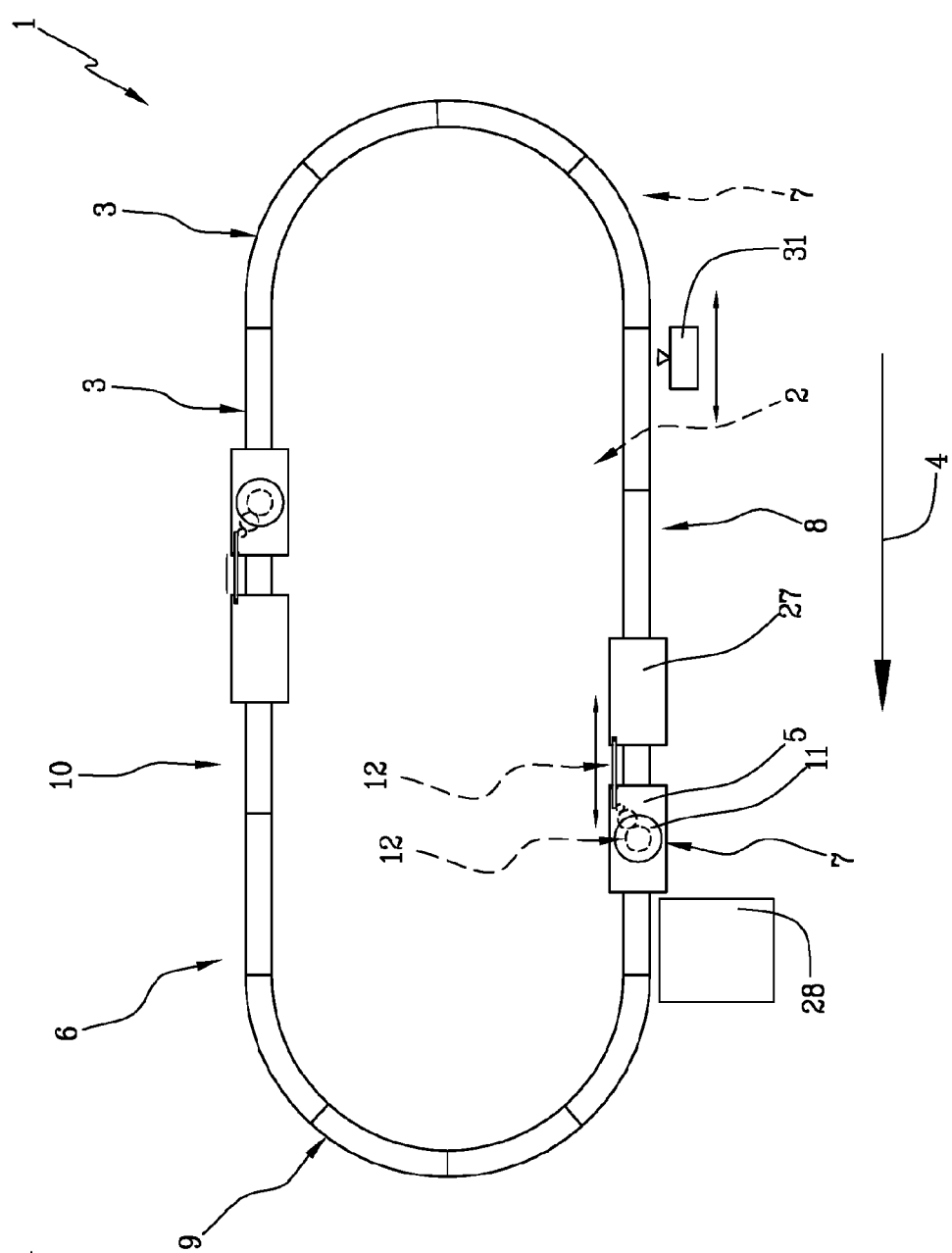
FIG. 4 is a schematic view from above of a second embodiment of the conveying machine of containers.
Figure 5:
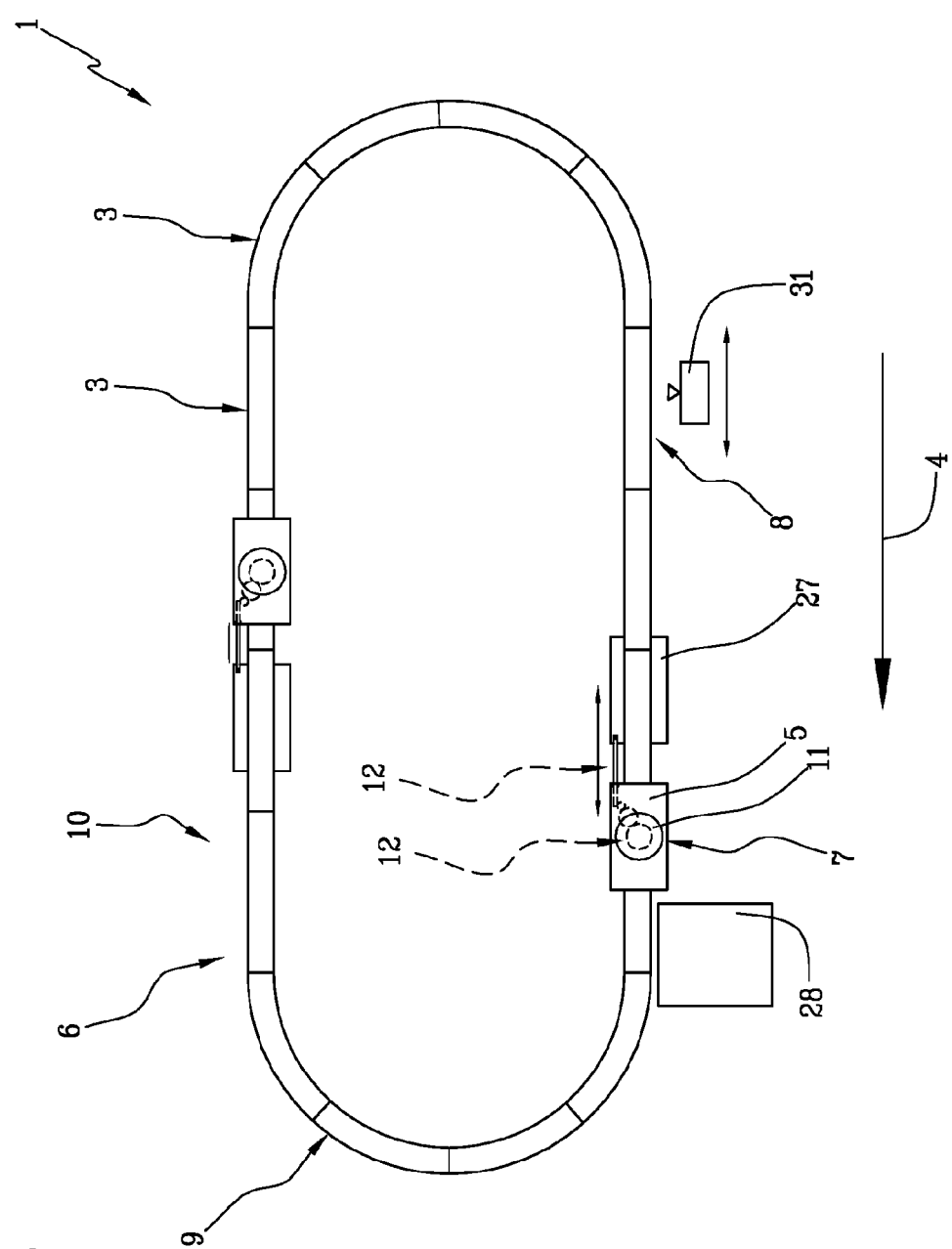
FIG. 5 is a schematic view from above of a variant of the second embodiment of the conveying machine of containers.

Further, in the embodiment illustrated in FIGS. 3 and 4, the machine 1 comprises, for each base module 3 and for each respective carriage 5, a corresponding upper module 21 and upper carriage 22 spaced vertically from the former; (in the following defined as the upper module and the lower carriage 5). The upper carriage 22 is mobile in a synchronised manner with the respective lower carriage 5. In detail, the upper carriage 22 comprises a retaining unit 24 acting on a top portion of the containers 2 in such a way as to keep the container 2 stationary in position.

The retaining unit 24 preferably comprises a jack which by exerting a pressure on the top of the container 2 maintains the container 2 headed against the plate 11 in such a way as to keep it stationary in position. The pressure exerted enables the plate 11, the container 2 and the jack to together form a single body. In this case, the container 2 is in any case carried by the lower carriage 5 according to what is commonly known as "bottom handling".

In other words, the machine 1 comprises two stators 6, 23 vertically superposed and aligned. In still other words, the lower stator 6 and the upper stator 23 follow like pathways.

Further, the number of carriages 5 mounted on upper stator 23 is equal to the number of carriages 22 mounted on the lower stator 6.

In an alternative embodiment, the number of carriages 5 mounted on the upper stator 23 is different to the number of carriages 22 mounted on the lower stator 6. For example, the number of carriages 5 mounted on lower stator 6 is greater than the number of carriages 22 mounted on the upper modules 23.

In particular, one or more of the carriages 5 mounted on the lower stator 6 can comprise plates 11 having a different format to the plates 11 of at least a part of the remaining carriages 5. In this way it is advantageously possible to load the containers 2 only on the carriages 5 with the plate 11 of the desired format as a function of working requirements. During the working condition of the machine 1, the carriages 5 with the plates 11 of the undesired format also move (commanded by the control unit 13) along the feed direction 4 without interfering with the other carriages 5.

Each retaining unit 24 preferably comprises a jack configured for exerting a pressure on the container 2 towards the lower carriage 5 in such a way as to keep the container 2 stationary in position.

To guarantee maintaining the container 2 in position, the lower carriage 5 and the respective upper carriage move alignedly and the control unit 13 is configured for moving the carriages 5, maintaining the alignment.

In practice, the movements of each pair of upper and lower carriages 5 reproduces the movement of the bottle along the feed direction 4, while the rotating plate 11 guarantees that the bottle can rotate about the axis thereof.

In other words, each pair of plates 11 and jack moves on two parallel horizontal planes, and the rotation axis thereof is the same.

Further, the machine 1 comprises modifying means 25 of the distance between an upper carriage 22 and the respective lower carriage 5 so as to change the distance as a function of the height of the containers 2 to be worked.

FIG. 3 shows an example of a machine 1 having a lower stator 6 and a corresponding upper stator 23. The modifying means 25 of the distance is defined by the fact that the upper stator 23 can slide in a vertical direction on runners which guarantee the possibility of carrying out a height adjustment.

The figure also shows that the machine 1 comprises a main frame 26 on which the lower stator 6 and the upper stator are mounted.

In FIG. 3 the lower plates 11 slide internally of the lower stator 6. Supports for engaging the labelling units 28 are mounted on the external periphery of the lower stator 6.

FIG. 4 illustrates an embodiment in which the lower plates 11 and the upper jacks are mounted at an external side of the stator 6. In this case, the upper stator 23 is supported by the inside thereof.

Naturally the present invention described in the foregoing for the machine 1 might be implemented for a conveyor from or towards a machine 1 (therefore upstream or downstream thereof), like, for example, a transfer star or the like.

Figure 8:
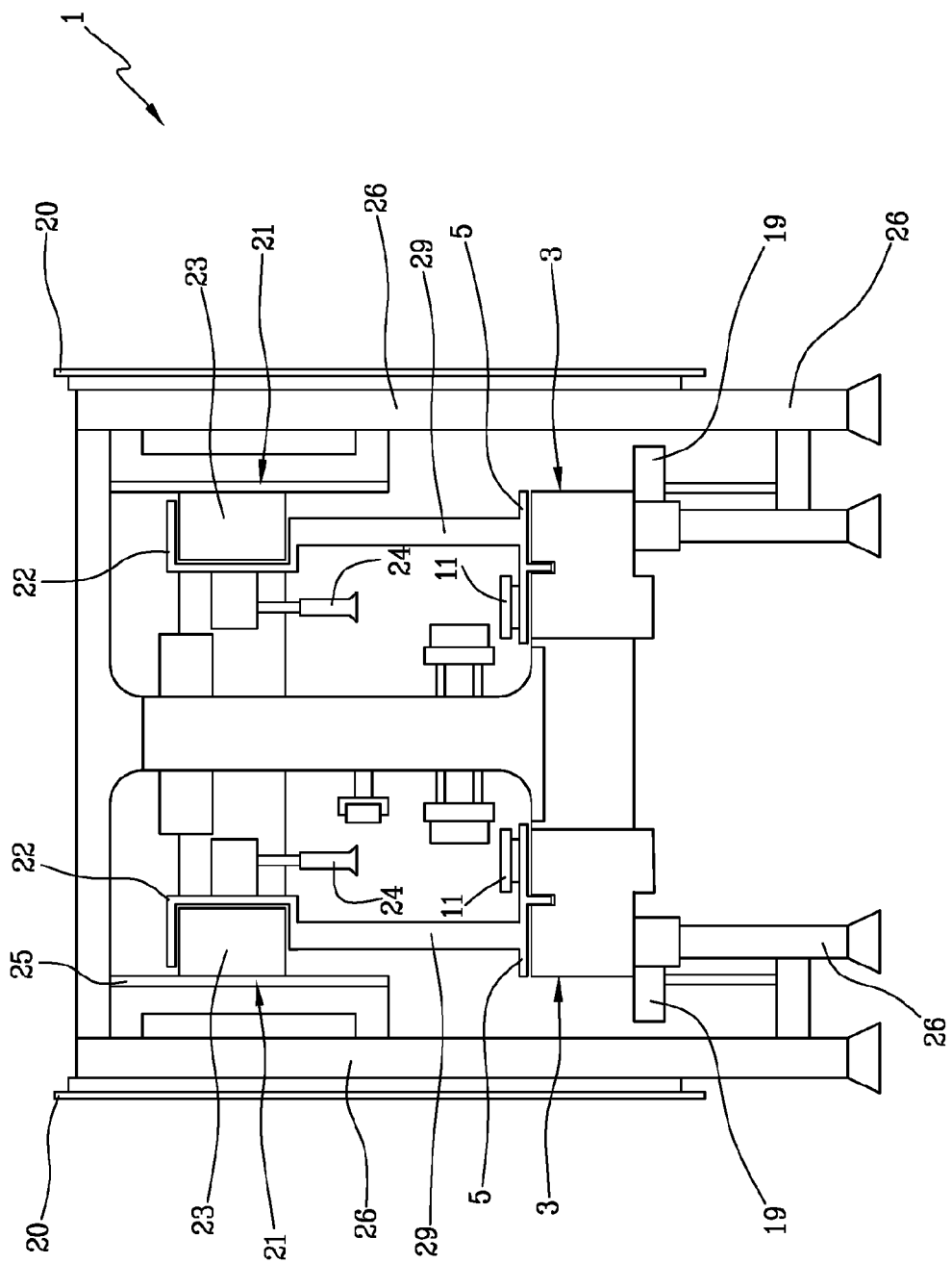
FIG. 8 is a lateral view in section of a further variant of the second embodiment of the conveying machine of containers.

FIGS. 3b and 8 illustrate variant realisations in which the upper carriage 22 defines an active linear motor and is mechanically connected (for example by means of a bar 29) in a fixed way to the lower carriage 5 which is maintained deactivated so as to remain idle on the base module 3 so that the upper carriage 22 draws the lower carriage 5. In this way, the lower carriage 5 is only slidable on the base 3, but does not define a linear motor.

FIG. 3b represents a case in which the movement means 12 of the plate 11 is motorised, while FIG. 8 illustrates a case where the movement means 12 of the plate 11 is of a mechanical type.

As regards the functioning of the machine 1, it is directly derived from what has been described above and in the foregoing.

The machine 1 according to the present invention is normally inserted in a broader context of a conveying system of containers 2 in which each container 2 is borne (by a conveyor belt, spacing means and input star) on a plate 11 of the machine 1 which transports the container 2 along the feed direction 4 up to an outlet star which extracts the container 2 from the machine 1.

Along the feed direction 4, each container 2 passes by different units.

For example, the first device that encounters the container 2 is a following detecting device which samples the profile of the container 2 in the search for a recognition sign with respect to which the first label is to be applied.

Thereafter, the container 2, by moving along the straight forward portion 8, encounters a first labelling unit 28 which applies the first label, then following the curve, and in the straight return portion 10 encounters, for example, a second and a third labelling group which respectively apply the second and third label.

Lastly the bottle is collected by the carriage 5 from the outlet star and deposited on an outlet conveyor belt.

In this case, the feed circuit is formed by two curved portions (two 180° curves) and by two straight portions.

The operations that are carried out on the bottle, such as the orientation and the application of labels advantageously take place in the two straight portions of the circuit.

It is clear that if it were desired to engage new labelling units 28 to the circuit, it would be sufficient to lengthen only the straight portions. For example, a linear portion might be added on each side to increase the length of the straight pathway, and consequently the space for the addition of new labelling units 28.

The present invention attains the set aims.

Firstly the present invention enables reducing the design times of the machine 1, as it is only necessary to decide on the length of the straight portions as a function of the working needs, while the rest (engaging and the performance of the labelling unit 28, radii of curvature, . . . ) would remain equal and fixed.

Secondly, the spaces occupied by the machine 1 would be smaller than a machine 1 having a rotating carousel. In fact, according to the present invention, a large part of the space that first was at the centre of the carousel on a traditional machine 1 is recuperated as the stator 6 substantially has a "0" shape (zero).

Further, with the present invention it is possible to modify the performance and characteristics of production of the machine 1 without physical re-designing. In fact, the present invention enables easily varying the number of plates (it is sufficient to add carriages 5), the "machine 1 step" (it is sufficient to adequately accelerate or brake the carriages 5) and the dimensions (it is sufficient to add/remove base modules 3).

Lastly, the conveying system of the bottles on the plates (screw conveyor, transfer star, . . . ) would stay the same with respect to what has been used up to now as it would be sufficient to coordinate the radius of curvature of the curved portion 9 with the radius of the star.

The invention claimed is:

1. A conveyor implementable from or toward a machine for containers, the conveyor comprising:
    at least one base module having a predetermined length along a feed direction of the containers for defining at least a part of a main feed circuit;
    at least one supporting carriage for the containers, slidably mounted on said at least one base module and movable along the feed direction for moving the containers;
    said at least one base module and said at least one supporting carriage together defining a linear motor, wherein a stator comprises the at least one base module and a rotor comprises the at least one supporting carriage;
    a supporting plate for supporting the containers, which is rotatably mounted on the at least one supporting carriage and is rotatable about an own axis that is transverse to the feed direction of the containers in such a way as to rotate a respective container, in use positioned on the supporting plate, about itself with respect to the at least one supporting carriage;
    means for moving the supporting plate, wherein the means for moving the supporting plate are operatively connected to the supporting plate to rotate the plate about itself;
    a control unit operatively connected to the at least one supporting carriage for commanding movement thereof along the feed direction and operatively connected to the means for moving the supporting the plate for activating the rotation of the supporting plate or for blocking the supporting plate in a desired rotated angular position, wherein the control unit is configured to control the position of the at least one supporting carriage along the feed direction;
    an auxiliary carriage mechanically connected to the at least one supporting carriage and mobile with respect thereto so as to near or distance or maintain a constant distance therefrom during the movement of the at least one supporting carriage and the auxiliary carriage;
    said movement means being arranged between the at least one supporting carriage and the auxiliary carriage and being configured for rotating the supporting plate about itself in a case of reciprocal nearing or distancing between the at least one supporting carriage and the auxiliary carriage and for blocking the supporting plate in position in a case of maintaining the constant distance between the two,
    said auxiliary carriage defining a rotor of a linear motor.

2. The conveyor according to claim 1, wherein the auxiliary carriage and the at least one supporting carriage are mechanically connected in such a way to travel in pairs substantially at the same velocity apart from reciprocal movements for carrying out the rotation of the plate.

3. The conveyor according to claim 1, wherein the auxiliary carriage is mounted on a base module belonging to a main feed circuit of the at least one supporting carriage.

4. The conveyor according to claim 1, wherein the auxiliary carriage is mounted on at least an auxiliary module belonging to an auxiliary circuit that is different with respect to a main feed circuit and having a feed direction parallel thereto.

5. The conveyor according to claim 4, wherein the auxiliary circuit and the main feed circuit are respectively superposed.

6. The conveyor according to claim 1, wherein the movement means comprises a first part connected to the auxiliary carriage and a second part connected to the t least one supporting carriage, said first and second part being in reciprocal contact so that the movement of the first part with respect to the second part generates a rotation of the supporting plate.

7. The conveyor according to claim 6, wherein the first and the second part of the movement means comprise mechanical gearings.

8. The conveyor according to claim 1, further comprising a plurality of supporting carriages, wherein the plurality of supporting carriages are movable independently of one another.

9. A conveying machine for containers comprising the conveyor according to claim 1, further comprising:
    at least an application unit configured to apply a recognizing sign on the container and arranged laterally with respect to the feed direction so as to apply the recognition sign on the container;
    wherein the control unit is configured for:

activating the rotation of the supporting plate so as to bring the container into a desired angular position when the at least one supporting carriage reaches the application unit;

controlling the angular position of the supporting plate during a transit of the at least one supporting carriage at the application unit.

10. The conveying machine according to claim 9, wherein the control unit is configured for maintaining the supporting plate in the rotated angular position during the transit of the carriage at the application unit, or for rotating the supporting plate starting from the rotated angular position during the transit of the carriage at the application unit.

11. The conveying machine according to claim 9, further comprising a follower device for detecting the orientation of the containers before each container reaches the application unit.

12. The conveying machine according to claim 9, wherein the supporting plate is configured for supporting a container by a base thereof or the supporting plate comprises retaining means configured for supporting a container by a top of the container.

13. The conveying machine according to claim 9, further comprising for each base module and for each respective supporting carriage, a corresponding upper module and an upper carriage spaced vertically from the base module and a lower carriage, said upper carriage being movable in a synchronised manner with the respective lower carriage, the upper carriage comprising a retaining unit acting on a top portion of the containers in such a way as to keep the containers stationary in position.

14. The conveying machine according to claim 13, wherein the upper carriage defines an active linear motor and is mechanically connected in a fixed way to the lower carriage which is maintained deactivated so as to remain idle on the base module so that the upper carriage draws the lower carriage.

15. The conveying machine according to claim 9, wherein a number of supporting carriages mounted on the lower modules is greater than a number of supporting carriages mounted on the upper modules.

* * * * *